Patented Aug. 8, 1950

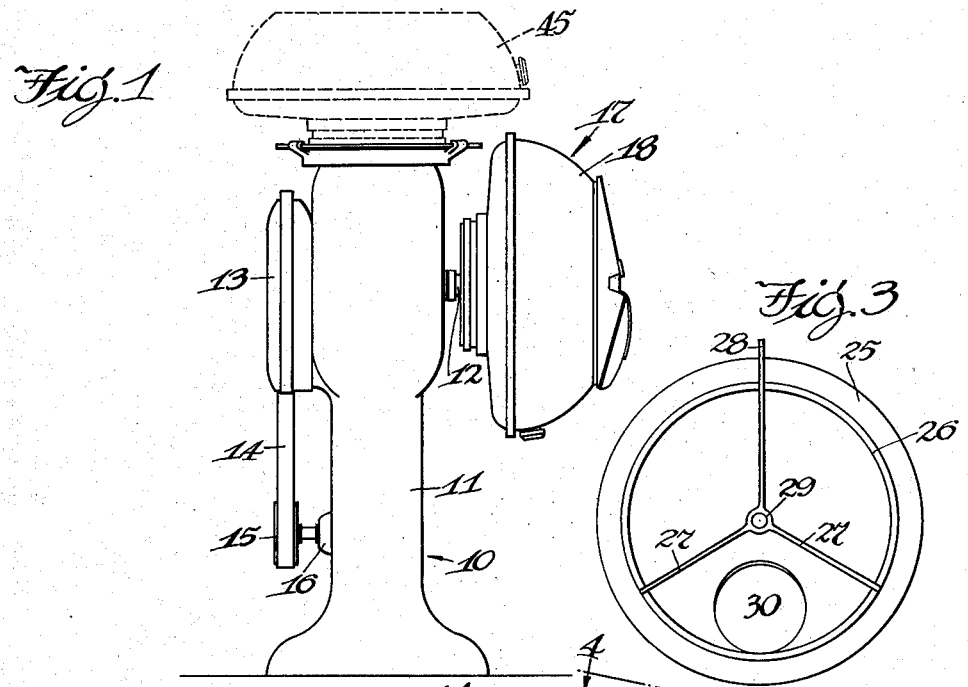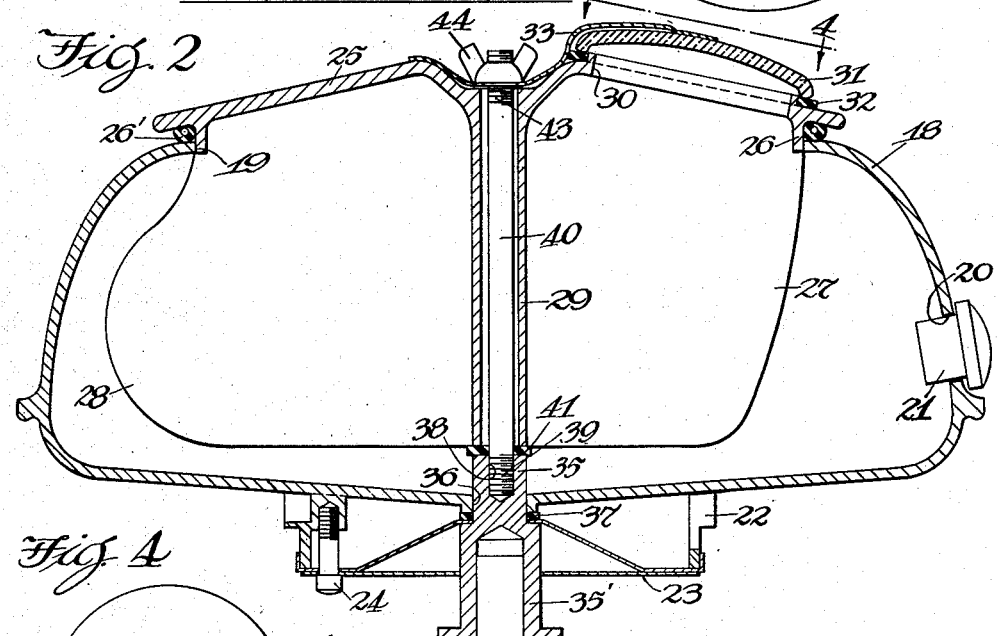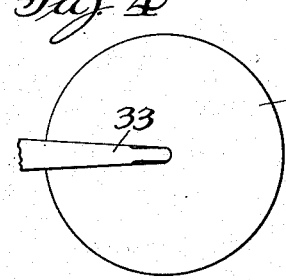

2,518,310

UNITED STATES PATENT OFFICE 2,518,310

CHURN ATTACHMENT FOR CENTRIFUGAL CREAM SEPARATORS

William H. Harstick, Oak Park, Ill., assignor to International Harvester Company, a corporation of New Jersey Application March 23, 1946, Serial No. 656,586

1 Claim. (Cl. 259—81)

This invention relates to a churn for churning butter or the like, and more particularly to a churn adapted to be used with a cream separator. More specifically, the invention relates to an improved churn construction.

It is an object of this invention to provide an improved churn construction that is easily adaptable to be operated with a centrifugal cream separator.

It is another object of this invention to provide a rotatable churn for butter or the like which may be mounted on and be driven by the manual cranking shaft of a centrifugal cream separator.

It is a still further object of this invention to provide a rotatable churn that is readily attached to and may be easily removed from a centrifugal cream separator so that the same may be cleaned and washed after using.

It is another object of the invention to provide an improved churn construction which may be readily washed and is inexpensive to manufacture.

It is still another object to provide an improved churn construction having paddle wheels connected to a cover plate or closure member for said churn.

Further objects and advantages of the invention will become apparent in the following specification wherein references are made to the accompanying drawing:

Figure 1 is a front elevational view of a centrifugal cream separator having a churn operatively connected thereto;

Figure 2 is a cross-sectional view through a churn;

Figure 3 is a bottom view of a cover plate or closure member for a churn; and

Figure 4 is a view taken along the line 4—4 of Figure 2.

A centrifugal cream separator is generally designated by the numeral 10 and consists of a vertically extending body portion or structure 11. The cream separator 10 includes a separating bowl of a conventional type and other associated parts which are not shown here since they form no part of the present invention. A horizontal shaft 12 projects from the supporting structure 11 and is driven by a gear or drive means, not shown, enclosed in a guard or cover 13. A V-belt 14 drives the drive means and is operatively connected to a pulley 15 which is driven by a suitable power means such as an electric motor 16.

A churn for churning butter or the like is generally designated by the numeral 17 and comprises a churn casing 18 annular in shape and having at its top an opening 19. An opening 20 is formed at one end of the casing 18 and is normally closed by means of a closure plug 21. Formed at the bottom of the casing 18 is an annular projection 22 which is circumferentially in abutment with a driving disk 23. The driving disk 23 is connected to the projection 22 by means of screws 24 only one of which is shown.

A cover plate or closure member 25 having an annular shoulder 26 cooperates with the opening 19. An annular seal 26' is positioned at the outer periphery of the annular shoulder 26 and is pressed between the closure member 25 and the churn casing 18 for suitably sealing the opening 19. The closure member 25 includes a pair of paddle members 27 and an enlarged paddle member 28 which are integrally formed with said closure member. The paddle members 27 and 28 project into the churn casing 18, the paddle member 28 extending beyond the periphery of the opening 19. A tubular shaft 29 is integrally formed with the cover plate 25 and the paddle members 27 and 28 and extends into the churn casing approximately the same distance as the paddle members.

An inspection opening 30 is formed in the cover plate 25. The opening 30 is covered by a glass cover or transparent plastic window 31 which suitably seals the opening by means of a sealing ring 32. A clamping finger 33 resiliently clamps the cover 31 and the seal 32 to the cover portion 25 thereby providing an effective seal.

Connected to the bottom portion of the churn casing 18 is a stub shaft 34. The stub shaft 34 is provided with an annular undercut portion 35 rigidly connected to driving disk 23, said portion projecting through an opening 36 into the churn casing 18. A seal 37 is provided between the churn casing 18 and an enlarged portion 35' of the stub shaft 34. The stub shaft 34 is further provided with a threaded opening 38 into which extends a threaded end 39 of a pin or connecting member 40. A seal 41 in abutment with the undercut portion 35 and the tubular member 29 suitably seals said tubular member from the interior of the churn casing 18. A set screw 42 is threaded to the end portion of the stub shaft 34 for clamping the churn 17 to the horizontally projecting shaft 12. The upper end of the connecting member 40 is threaded at 43 and extends through the clamping finger 33. A wing nut 44 is screwed to the end of the connecting member 40, said wing nut serving to clamp the glass cover 31 to the cover member 25 and the cover member 25 to the churn casing 18.

It can now be seen that the objects of the invention have been fully achieved. A simple, well-constructed, and novel churning device has been disclosed. As indicated in dotted lines at 45 in Figure 1, the churn casing 18 may also be used as a milk supply can for the centrifugal cream separator 10. When it is desired to churn cream the supply can is removed and is used as a churn. It is attached to the shaft 12 by means of the clamping means indicated, the shaft 12 normally having a hand crank connected thereto for manually turning and operating said cream separator.

The closure member 25 can be quickly attached and the wing nut 44 is tightened sufficiently so that the opening 19 is properly sealed. The cream to be churned can then be introduced into the opening 30 whereupon said opening is closed by means of the glass cover 31. The resilient clamping finger 33 thereupon is rotated over the glass cover 31 and with the sealing member 32 suitably seals the opening 30. The glass cover 31 also provides a suitable inspection window whereby the matter to be churned can be properly inspected at intervals. The matter to be churned can also be introduced through the opening 20 by removing the plug 21. This opening also serves as a drain opening for draining buttermilk from the churn after the churning is completed; or, it may be used for introducing water for washing the churned butter.

The paddle members 27 and 28 are so shaped that they can be inserted and removed through the opening 19 without any difficulty. Since the paddles 27 and 28 are combined with the cover plate 25 and can be removed therewith, the washing of the interior of the churn is greatly facilitated as well as the washing of the paddles themselves. This feature is of prime importance in this invention.

It is to be understood that various modifications may be made without departing from the spirit of the invention disclosed nor the scope thereof as defined in the appended claim.

What is claimed is:

For attachment to a driven shaft rotatable about a horizontal axis, a churn for churning butter and the like, said churn including a rotatable casing provided with an axial stub shaft for attachment to said driven shaft, the casing having an axial opening the opening being of substantially less cross-sectional dimension than the outer peripheral edge of the casing, a closure plate disposed over the opening, said closure plate including a tubular shaft projecting into the casing substantially in axial alignment with the stub shaft, a plurality of paddle members on said tubular shaft, said paddle members projecting radially outwardly within the casing, at least one of said paddle members projecting beyond the opening and substantially adjacent to the peripheral wall of the casing, means for tightly securing the closure member over the opening for sealing said casing, said means including a pin securely connected at one end to the casing, said pin extending longitudinally within the tubular shaft, means securely connecting said pin with said closure plate, and clamping means connecting said stub shaft to said driven shaft whereby the casing is rotatable with said shaft about a horizontal axis.

WILLIAM H. HARSTICK.

REFERENCES CITED

The following references are of record in the file of this patent:

UNITED STATES PATENTS

| Number | Name | Date |
| --- | --- | --- |
| 18,035 | Borrman | Aug. 25, 1857 |
| 53,429 | Felthouse et al. | Mar. 27, 1866 |
| 135,672 | Spiess | Feb. 11, 1873 |
| 913,399 | Kilpatrick | Feb. 23, 1909 |
| 1,465,179 | Risberg | Aug. 14, 1923 |
| 2,056,582 | Moussette, Sr. | Oct. 6, 1936 |